March 4, 1924.

M. FINK

NONSKID TIRE HOOD

Filed Nov. 7, 1922

1,486,080

WITNESSES

INVENTOR
Marcus Fink

ATTORNEYS

Patented Mar. 4, 1924.

1,486,080

UNITED STATES PATENT OFFICE.

MARCUS FINK, OF NEW YORK, N. Y.

NONSKID TIRE HOOD.

Application filed November 7, 1922. Serial No. 599,592.

*To all whom it may concern:*

Be it known that I, MARCUS FINK, a citizen of the United States, and a resident of the city of New York, borough of Manhattan, in the county of New York and State of New York, have invented a new and Improved Nonskid Tire Hood, of which the following is a full, clear, and exact description.

This invention aims to provide a new and improved non-skid attachment for the tire of an automobile wheel, the new attachment being particularly adapted for use in connection with a rubber tire of the pneumatic type.

The prime object of the invention is to provide a construction which may be attached to and removed from a tire easily and quickly and without special tools, and more quickly and easily than the usual tire chains heretofore provided and, as is well-known, often in a very much tangled condition when taken out of the tool box for mounting on the tire; which will operate efficiently as to its appointed function when mounted on the wheel, and yet not damage the tire itself to anything like the extent of such tire chains, and indeed protect rather than damage the tire at all; which, preferably, includes means for imparting to the same a longitudinal curvature resiliently maintained in such a way as to permit compact and safe storage of the attachment when demounted from the tire and to facilitate mounting and demounting the attachment relative to the tire; which, if including such last-mentioned means, has the latter incorporated therein in such a way that incidentally a puncture-proof protector is enwrapped about the tire when the attachment is mounted on the latter, while at the same time such protector may not chafe or injure the rubber parts of the tire shoe; which will not be unattractive when mounted on the tire, and will even increase the riding comfort of the vehicle and the quietness of travel as contrasted with the ordinary tire chains; and which will be durable, have ruggedly carried yet easily replaceable non-skid elements proper, and be of such a character throughout as to permit the same to be manufactured at very low cost.

Referring now to the accompanying drawing, wherein is shown a structure as at present preferred to attain the various ends and objects above indicated,—but, of course, a structure which is merely an illustrative embodiment of one of the many possible ways in which the invention may be carried out,—

Figure 1:
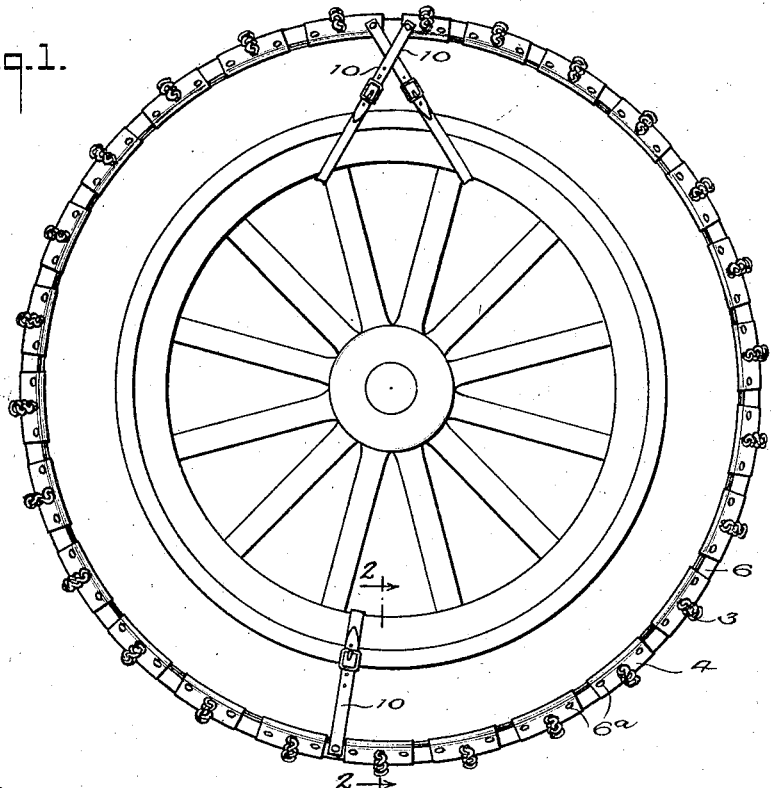
Figure 2:
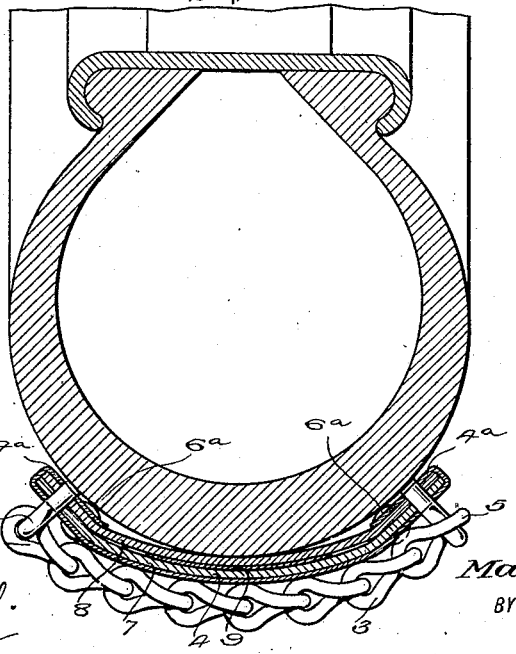

Fig. 1 is a side elevation of an automobile wheel which carries a standard type of pneumatic tire temporarily equipped with the new tire hood; and Fig. 2 is an enlarged sectional view taken on line 2—2 of Fig. 1.

Similar reference characters refer to similar parts in both views.

The non-skid elements preferably employed are a plurality of spaced cross chains 3, arranged on the outside of the tire hood and anchored at opposite ends thereto, and against the outer surfaces of plate-like metallic cross pieces 4, as by means of rivet hooks 5.

The shanks of these or any equivalent fastening means 5 are preferably passed through the tire hood proper 6 (which may be described as the main strap member or strap), so that their inner ends may be riveted against inturned ends 4ᵃ which are preferably present as parts of cross pieces 4. These cross pieces are preferably of some non-corrosive, rather flexible sheet metal; and it will be noted that the same are of preferably identical form and of rectangular outline before being bent to shape the ends 4ᵃ, thereby to increase the general economy of construction of the entire attachment.

If desired, the cross pieces 4 may be additionally riveted to the tire hood proper as indicated at 6ᵃ.

The tire hood proper may include one or any number of plies of flexible material, as outer and inner canvas strips 7 and 8, and also includes, preferably, what may be termed a third or resilient ply of non-fibrous material, as a metal strip 9 desirably almost if not quite as long as the two canvas strips 7 and 8, and nested between such canvas strips but otherwise unattached thereto in the illustrative construction shown in the drawing. This member 9 is conveniently a rather thin spring-steel leaf-spring of the suitable standard width and gauge.

This description of the simple attachment of the present invention is completed, when it is pointed out that the tire hood proper further is equipped with a plurality of spaced felly-embracing attaching means as indicated; such means here comprising three belts, of canvas, leather or the like, as shown at 10. According to the present construction two of the belts are carried at the opposite ends of the tire hood and one at about its middle.

The operation and manner of attachment and detachment of the new appliance will be readily understood from the preceding description; except that the important functions of the metal leaf-spring strip 9 should be expressly pointed out, as serving the following important results, in addition to acting as a member incidentally protecting the tire carcass against puncture while the tire hood is in place. Such functions result from the fact that the strip 9, while of course resilient as described, may be, and is preferably given a tendency toward maintaining the tire hood always longitudinally curved in conformity more or less to the curvature of the tire circumference. This provision has been found to permit instant and easy mounting of the tire hood on the tire; while rendering equally simple and quick the demounting of the tire hood. Also, when the tire hood is not in use, it may be wound on itself to as large a fraction of its length, or for as many turns, as desired, and secured in that condition either by the straps 10 or otherwise, for compact storage when not required to be mounted on the wheel.

It will thus be seen that I have provided a construction well adapted to attain the various ends and objects above stated and indicated, whether the new attachment is constructed precisely in all particulars as herein described or not; and accordingly it is to be understood that various changes may be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A non-skid tire hood including an elongate strap of flexible fibrous material, an elongate strap of flexible metal on the inner side of the strap of fibrous material, and cross chains at spaced points along the hood on the outer side of said strap of fibrous material, said cross chains being secured in place at opposite ends near the opposite side edges of the hood.

2. The tire hood defined in claim 1, wherein said hood includes a second strap of flexible fibrous material on the inner side of said strap of flexible metal.

3. As a new article of manufacture, a tire hood including a flexible strap adapted to be wrapped around the tire tread, fastening means carried by the hood for mounting the strap over the tire tread to overlie substantially the entire circumference thereof, and non-skid structures movably carried at spaced points on the road-contacting face of the strap, said strap including means to resiliently urge the same into a predetermined curvature.

4. As a new article of manufacture, a tire hood including a flexible strap adapted to be wrapped around the tire tread, fastening means carried by the hood for mounting the strap over the tire tread to overlie substantially the entire circumference thereof, and non-skid structures movably carried at spaced points on the road-contacting face of the strap, said strap including a metallic element running lengthwise of the strap on one side thereof and a plurality of spaced metallic elements running laterally of the strap.

5. As a new article of manufacture, a tire hood including a flexible strap adapted to be wrapped around the tire tread, fastening means carried by the hood for mounting the strap over the tire tread to overlie substantially the entire circumference thereof, and non-skid structures movably carried at spaced points on the road-contacting face of the strap, said strap including a metallic element running lengthwise of the strap on one side thereof and a plurality of spaced metallic elements running laterally of the strap and directly underlying said non-skid structures.

6. As a new article of manufacture, a tire hood including a flexible strap adapted to be wrapped around the tire tread, fastening means carried by the hood for mounting the strap over the tire tread to overlie substantially the entire circumference thereof, and non-skid structures movably carried at spaced points on the road-contacting face of the strap, said strap including a metallic element running lengthwise of the strap on one side thereof and a plurality of spaced metallic elements running laterally of the strap, said strap also including a foundation member of flexible fibrous material to which certain of said metallic elements are attached.

MARCUS FINK.